United States Patent
Duffaut

(10) Patent No.: US 12,139,931 B2
(45) Date of Patent: Nov. 12, 2024

(54) SYSTEMS AND METHODS OF MONITORING A WATERLINE LEVEL OF A SWIMMING POOL OR SPA

(71) Applicant: ZODIAC POOL CARE EUROPE, Belberaud (FR)

(72) Inventor: Simon Duffaut, Castelginest (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 16 days.

(21) Appl. No.: 17/953,093

(22) Filed: Sep. 26, 2022

(65) Prior Publication Data

US 2023/0105447 A1    Apr. 6, 2023

Related U.S. Application Data

(60) Provisional application No. 63/251,126, filed on Oct. 1, 2021.

(51) Int. Cl.
   *E04H 4/16* (2006.01)
   *E04H 4/12* (2006.01)
   *G01F 23/18* (2006.01)
   *G08B 7/06* (2006.01)

(52) U.S. Cl.
   CPC ............ *E04H 4/1654* (2013.01); *E04H 4/12* (2013.01); *G01F 23/185* (2013.01); *G08B 7/06* (2013.01)

(58) Field of Classification Search
   CPC ........... E04H 4/12; G01F 23/185; G08B 7/06; G05D 9/12
   See application file for complete search history.

(56) References Cited

U.S. PATENT DOCUMENTS

| | | | |
|---|---|---|---|
| 10,316,534 B2* | 6/2019 | Michelon | E04H 4/1654 |
| 2004/0261167 A1 | 12/2004 | Panopoulos | |
| 2017/0362845 A1* | 12/2017 | Korenfeld | G05D 1/0219 |
| 2020/0033898 A1* | 1/2020 | Shaaban | G01K 13/02 |

FOREIGN PATENT DOCUMENTS

EP        3249137 A1    11/2017

OTHER PUBLICATIONS

International Application No. PCT/IB2022/059144, International Search Report and Written Opinion mailed on Jan. 9, 2023, 13 pages.

International Application No. PCT/IB2022/059144, International Preliminary Report on Patentability mailed on Apr. 11, 2024, 9 pages.

* cited by examiner

*Primary Examiner* — Christine J Skubinna
(74) *Attorney, Agent, or Firm* — Kilpatrick Townsend & Stockton LLP

(57) ABSTRACT

An automatic swimming pool cleaner (APC) for swimming pools and spas may be used to monitor and/or determine a waterline level of the swimming pool or spa. Optionally, the determined waterline level may be provided on a user interface of an external device such as but not limited to a control box or a user device. An alert may be provided to a pool owner or other user based on the waterline level relative to a threshold waterline level. Optionally, at least one piece of equipment associated with the swimming pool or spa may be controlled based on the determined waterline level.

20 Claims, 3 Drawing Sheets

SYSTEMS AND METHODS OF MONITORING A WATERLINE LEVEL OF A SWIMMING POOL OR SPA

REFERENCE TO RELATED APPLICATION

This application claims the benefit of U.S. Provisional Patent Application No. 63/251,126, filed on Oct. 1, 2021, and entitled SYSTEMS AND METHODS OF MONITORING A WATERLINE OF A SWIMMING POOL OR SPA, the content of which is hereby incorporated by reference in its entirety.

FIELD OF THE INVENTION

This invention relates to water-containing vessels such as swimming pools and spas, and more particularly, to systems and methods for monitoring a waterline level of the swimming pool or spa.

BACKGROUND OF THE INVENTION

Water-containing vessels such as swimming pools and spas are susceptible to changes and fluctuations in the water level or waterline level of water in the pool or spa. Such changes in the waterline may be caused by various factors such as but not limited to rainfall and/or evaporation, and the changes may occur quickly or gradually. As examples, rainfall may quickly raise the waterline in the pool while evaporation may more gradually lower the waterline over the course of a season. Other than visually observing a change in the waterline (and usually only discernable after a rapid change due to, e.g., rainfall), pool owners do not know desired water levels and/or exactly when a pool needs to be filled. As a result, the waterline level of the pool may drop below a threshold level without a user knowing, which in turn may affect performance of various pool equipment and/or water quality of the pool or spa.

SUMMARY

Described herein are systems and methods of monitoring the waterline level of a swimming pool or spa that do not rely on a user having to estimate when a waterline level of a swimming pool or spa drops below a threshold level. In certain embodiments, a mobile pool cleaning apparatus such as but not limited to an automatic swimming pool cleaner (APC) may periodically monitor the pool to determine the waterline.

According to certain embodiments, a method of monitoring a waterline level of a swimming pool includes determining the waterline level using an APC.

According to some embodiments, a method of monitoring a waterline level of a swimming pool includes monitoring the waterline over time using an APC.

According to various embodiments, a pool system includes means for monitoring the waterline level of the swimming pool.

According to certain embodiments, a pool system includes an APC configured to monitor and/or determine the waterline level of the swimming pool.

According to various embodiments, a method of monitoring the waterline level of the pool includes sending, generating, and/or displaying a waterline alert for a swimming pool on a control box or a user device. In some embodiments, the waterline alert is displayed when a waterline determined by the APC or other mobile pool cleaning apparatus associated with the control box within the swimming pool is below a waterline alert limit.

According to some embodiments, a method includes controlling pool equipment associated with the swimming pool or spa based on a determined and/or monitored waterline.

According to various embodiments, a pool system includes an APC configured to measure at least one characteristic of the swimming pool, where the pool system may determine a waterline level of the swimming pool based on the measured at least one characteristic.

According to certain embodiments, a method of operating a pool system includes determining a waterline level of a swimming pool using an APC and controlling at least one piece of pool equipment associated with the swimming pool based on the determined waterline level.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION OF THE INVENTION

Described herein are systems and methods of monitoring the waterline level of a swimming pool or spa that do not rely on a user having to estimate when a waterline level of a swimming pool or spa drops below a threshold level. In certain embodiments, a mobile pool cleaning apparatus such as an APC may periodically monitor the pool to determine the waterline. In such embodiments, a user and/or another component of the pool system can be alerted (e.g., by the APC or a control system in communication with the APC) when the waterline is below the threshold level. In various embodiments, one or more pieces of equipment associated with the pool or spa may be controlled based on the determined waterline. In some embodiments, the threshold level for the waterline is based on user-input so that the threshold waterline level is a user-defined threshold waterline level. In other embodiments, the threshold level for the waterline may be determined and/or set based on pool equipment requirements and/or water quality. Optionally, the system may be configured so the user can choose when to receive the alert based on the distance between the waterline and the threshold waterline level. Various other benefits and advantages may be realized with the systems and methods provided herein, and the aforementioned advantages should not be considered limiting.

Figure 1:
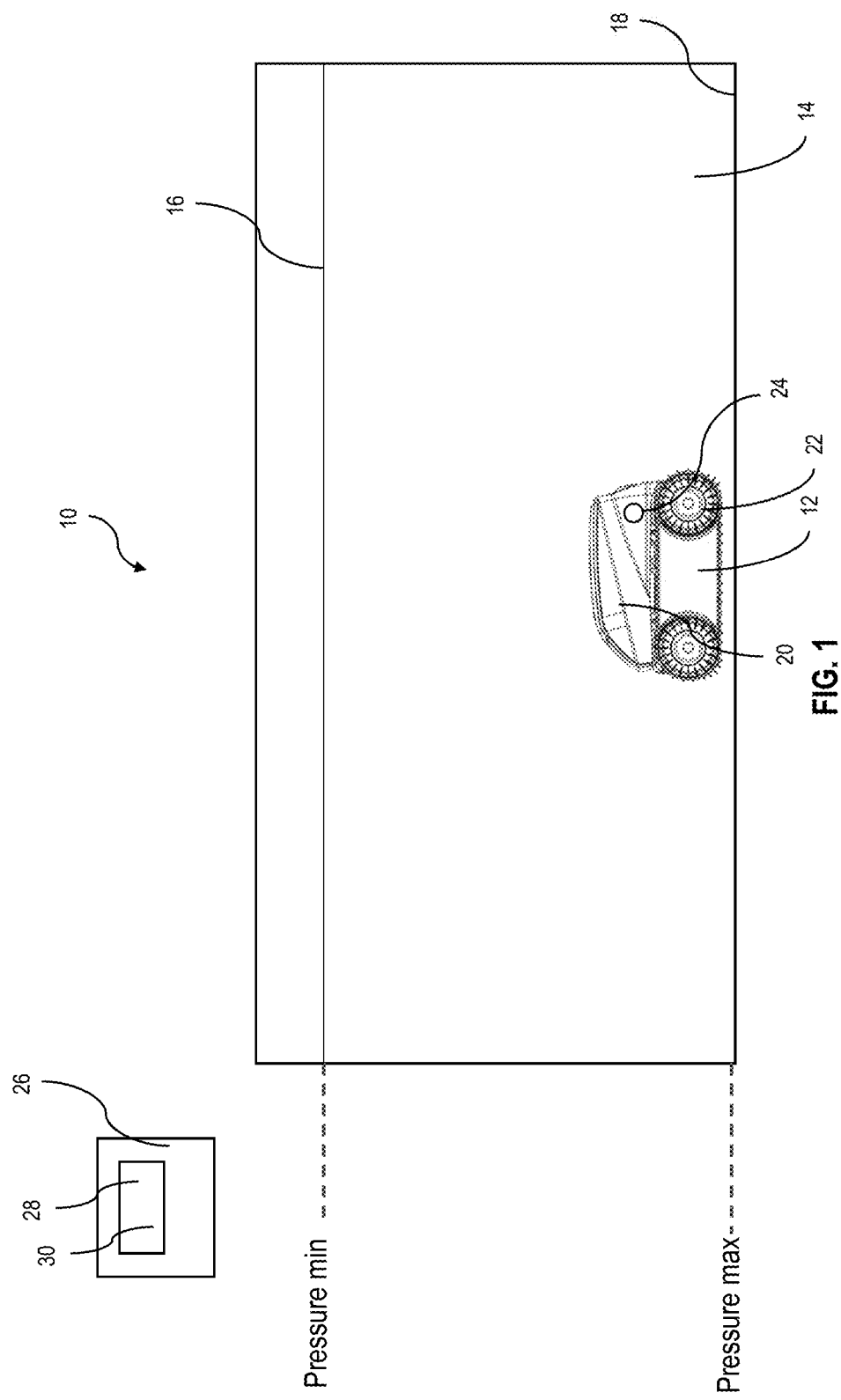
FIG. 1 illustrates a pool system for monitoring a waterline level of a swimming pool or spa according to embodiments.

FIG. 1 illustrates an example of a pool system 10 according to embodiments. The pool system 10 generally includes a mobile pool cleaning apparatus such as an APC 12 positionable in a pool 14.

As illustrated in FIG. 1, the pool 14 generally includes a floor 18 and water of the pool 14 includes a waterline 16. A depth of the pool 14 is a distance from the waterline 16 to the floor 18, and the waterline 16/depth of the pool 14 may fluctuate as discussed above.

The APC 12 may be various types of APCs as desired and should not be considered limiting on the disclosure. As non-limiting examples, the APC 12 may be either "hydraulic" or "robotic" (or "electric"), depending on the source of its motive power. Hydraulic cleaners, for example, typically use pressurized (or depressurized) water to affect their movement within pools, whereas robotic cleaners typically utilize an electric motor to cause their movement. Moreover, hydraulic cleaners frequently are subcategorized as either "pressure-side" or "suction-side" devices, with pressure-side cleaners receiving pressurized water output from an associated water-circulation pump and suction-side cleaners, by contrast, being connected to an inlet of the pump. In the embodiment illustrated in FIG. 1, the APC 12 generally includes a body 20 and optional motive elements 22. The motive elements 22 may be various suitable devices or structures suitable for enabling movement of the APC 12 along a surface, including but not limited to wheels, rollers, feet, tracks, combinations thereof, and/or other suitable motive elements 22 as desired. The APC 10 may include various components on and/or within the body 20 such as a motor block, a filter, a pump, a controller, etc. The APC 12 optionally may include one or more cleaning elements (e.g., a brush assembly with one or more brushes) suitable for cleaning a surface and/or directing debris into the APC 12 and/or towards a filter of the APC 12.

In various embodiments, the APC 12 includes one or more sensing means or systems (referred to herein as "sensors 24") for measuring one or more characteristics of the water in the pool 14. The one or more sensors 24 may be various sensors, systems, of mechanisms as desired suitable for measuring one or more conditions of the water in the pool 14, such as but not limited to sensors, systems, or mechanisms for measuring a pressure, a depth, a temperature, an oxidation reduction potential, a pH, a turbidity, and/or a conductivity of the water. In some embodiments, the one or more characteristics of the water measured by the one or more sensors 24 may be associated with a depth or waterline level of the pool. In such embodiments, the sensors, systems, or mechanisms may include, but are not limited to, pressure sensors, depths sensors, time-of-flight sensors, coded wheels, combinations thereof, and/or other systems, devices, and/or mechanisms suitable for measuring the depth and/or waterline level of the pool As a non-limiting example, the pressure measured at the waterline 16 of the pool 14 is a minimum pressure, and the pressure measured at the bottom of the pool (e.g., proximate to the floor 18) may be a maximum pressure. The APC 12 with a pressure sensor as the one or more sensors 24 may continually and/or periodically measure and record pressures to which it is subjected during a cleaning cycle and/or during any other measurement period of time as desired. At the end of the cleaning cycle (or after the period of time has lapsed), the APC 12 may determine the maximum and minimum pressure values, and a difference between the maximum and minimum pressure values may be used to determine and/or estimate the depth of the pool 14 and thereby the waterline 16. In various embodiments, if the depth has decreased since the prior cycle or measurement period or decreased relative to a threshold level or other expected value, then the waterline 16 of the pool 14 has decreased. Conversely, if the depth has increased since the prior cycle or measurement period or increased relative to a threshold level or other expected value, then the waterline 16 has increased.

In other embodiments, characteristics of the water other than and/or in addition to pressure may be used to determine and/or estimate the depth of the pool 14. As non-limiting examples, water temperature, light levels, etc. may be used to determine and/or estimate the depth of the pool 14.

The APC 12 may monitor and/or measure the characteristic associated with the depth of the pool 14 (e.g., the pressure) at various intervals of time as desired to discern information about the waterline level. In some embodiments, the APC 12 may measure the characteristic as part of a cleaning cycle, as part of a dedicated waterline measuring cycle, at regular intervals, at irregular intervals, when prompted by the pool owner, and/or as otherwise desired. As a non-limiting example, the APC 12 may periodically perform a measuring cycle to measure the maximum pressure and the minimum pressure encountered during the measuring cycle to discern information about the waterline level. In another non-limiting example, the APC 12 may perform a cleaning cycle (and thus record pressure measurements) approximately every 12 hours, every 18 hours, every 24 hours, every 36 hours, every 48 hours, and/or as otherwise desired.

In some embodiments, a controller (e.g., processor and/or controller) may receive the measured characteristics from the sensor(s) 24 of the APC 12, and the controller may determine the waterline level based on the measured characteristics. In certain embodiments, the controller may generate a response (e.g., send a control signal, generate an alert, etc.) based on the comparison of the determined waterline level to the threshold waterline level.

The controller may be onboard the APC 12 and/or may be at a location remote from the APC 12 as desired. The controller optionally includes an associated user interface, including but not limited to a graphical user interface or a human machine interface, such that the controller may obtain information from a user and/or provide information to the user. In such embodiments, the user interface may be on the controller itself or may be at a location remote from the controller such as, but not limited to, another location within the pool system 10, on a user device, etc. Additionally, or alternatively, the controller optionally may include various communication modules such that the controller may receive from and/or send information to the APC 12 and/or other devices as desired. Non-limiting examples of communication modules may include systems and mechanisms enabling wired communication and/or wireless communication (e.g., near field, cellular, Wi-Fi, Bluetooth®, Bluetooth Low Energy (BLE), etc.).

In various embodiments, the APC 12 may be communicatively coupled to one or more external devices 26. Such communication may be wired or wireless as desired. The external devices 26 may be a control box for the APC 12, a user device (e.g., smart phone, tablet, computer, etc.), a third-party device (e.g., a device of a pool technician), combinations thereof, and/or other external devices 26 as desired. In various embodiments, the external device 26 includes an associated user interface 28, including but not limited to a graphical user interface or a human machine interface, such that the external device 26 may obtain information from a user and/or provide information to the user. The user interface 28 may include various features, including but not limited to a screen 30, buttons, visual indicators, and/or other features as desired. The user interface 28 may be used to convey information to a user and/or may be used by the user to access information and/or provide inputs and controls to the pool system 10.

In some embodiments, the APC 12 and/or the controller associated with the APC 12 may provide the waterline level measurement to the external device 26 and/or may provide an alert (auditory, visual, etc.) to and/or on the external device 26 based on the waterline level measurement. In one non-limiting example, an alert may be generated on the external device 26 based on the waterline level measurement falling below the threshold level.

Figure 2:
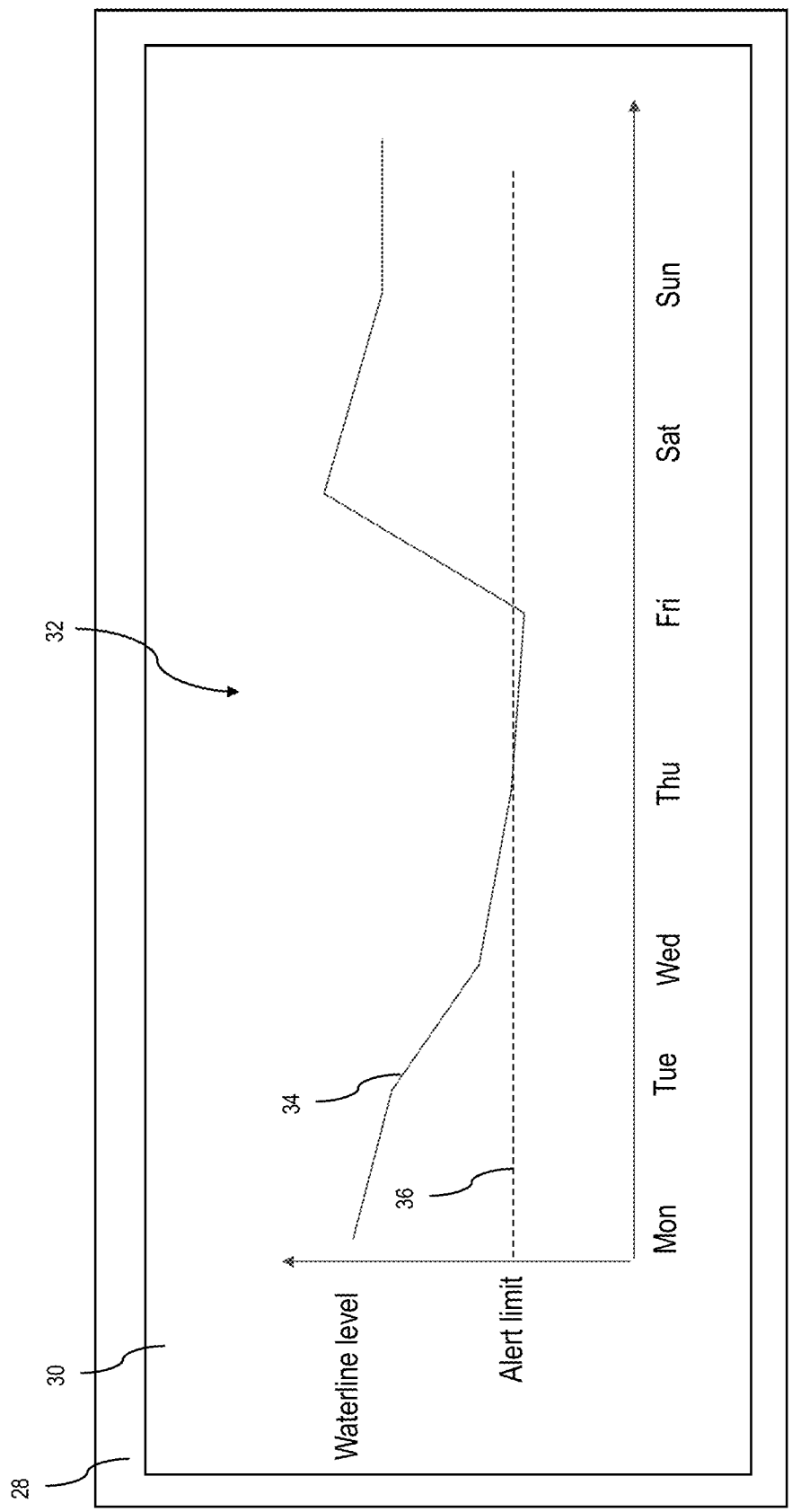
FIG. 2 is a graph illustrating monitoring of the waterline level of the swimming pool or spa of FIG. 1 according to embodiments.

FIG. 2 illustrates an example of a waterline level display 32 on the screen 30 of the user interface 28. In various embodiments, the device with the user interface 28 (e.g., smart phone or other user device) may include a software application associated with the APC 12 that displays a waterline level 34 determined by the APC 12. The application may show the waterline level over time as a graph as the waterline level display 32. As a non-limiting example, the waterline level 34 for a period of time, such as but not limited to one week, may be displayed. The application can also display an alert (e.g., control) limit 36 on the graph, which may correspond to a minimum threshold for the waterline. As mentioned, the alert limit 36 may be based on user input and/or may be determined by the system. The alert limit 36 may be various waterline levels as desired. As non-limiting examples, the alert limit 36 may be a minimum waterline level as set or determined by the pool system and/or a waterline level above a minimum waterline level (e.g., a user may choose to receive an alert before the waterline drops to the minimum level and/or the system may send an alert before the waterline drops to the minimum threshold level). In certain embodiments, the alert limit 36 is adjustable such that the waterline level at which the alert is provided is adjustable as desired. In some embodiments, a plurality of alert limits 36 may be utilized. As a non-limiting example, a first alert limit may indicate the waterline is a first predetermined distance away from the minimum waterline level, a second alert limit may indicate the waterline is a second predetermined distance away from the minimum desired waterline threshold level, etc.

Optionally, when the determined waterline level is at and/or below the alert limit 36, an alert may be generated. Such alerts may include but are not limited to auditory alerts, visual alerts (e.g., text, lights, graphics, etc.), tactile alerts, combinations thereof, and/or other alerts as desired. In some embodiments, the alert generated may prompt the pool owner to take an action (e.g., the pool owner may be alerted using text, sounds, graphics, light activation, etc. to add water to the swimming pool). In some embodiments, one or more pieces of equipment associated with the pool 14 may be controlled based on the waterline level being at and/or below the alert limit 36 and/or the threshold. As a non-limiting example, an automatic water filler may be activated responsive to the determined waterline level being at or below the threshold. As another non-limiting example, equipment such as pumps, chlorination systems, cleaning systems, etc. may be activated, deactivated, and/or otherwise controlled based on the determined waterline level.

Figure 3:
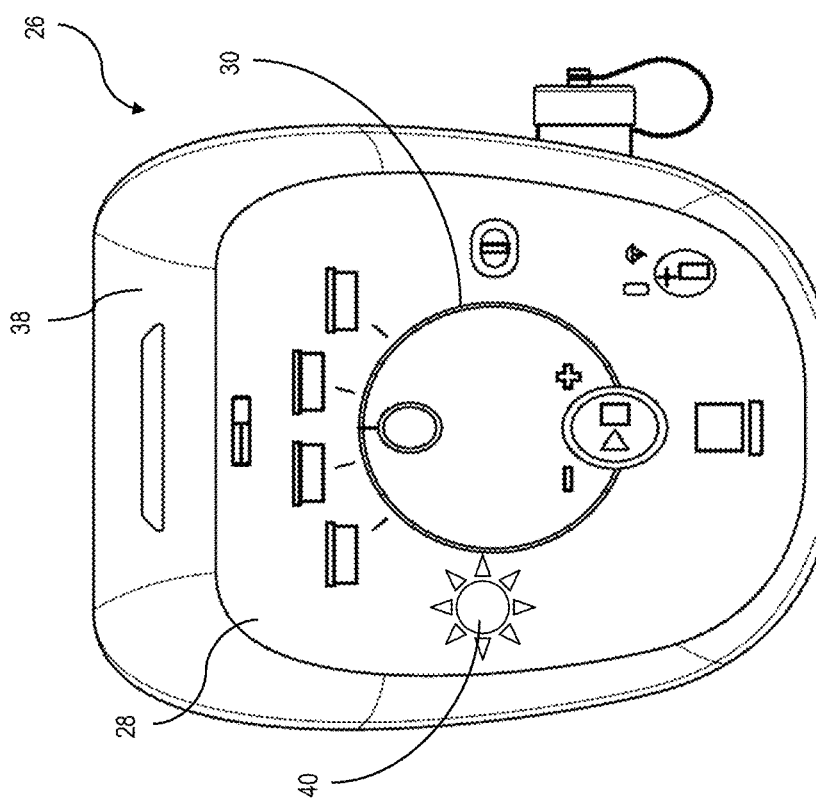
FIG. 3 illustrates a control box for an APC with a waterline level alert according to embodiments.

FIG. 3 illustrates an example of a control box 38 associated with the APC 12 as the external device 26. In the embodiment illustrated, the user interface 28 includes the screen 30 and a visual indicator 40 with one or more light sources. Light sources may be one or more light-emitting diodes (LEDs) and/or other light sources or combinations of light sources as desired.

In various embodiments, the visual indicator 40 is controlled based on the determined waterline level. In certain non-limiting examples, one or more characteristics of the visual indicator 40 may be controlled based on the determined waterline level being above the threshold or at or below the threshold. As non-limiting examples, an activation status of the visual indicator (e.g., on or off), a color of light, pattern of light, intensity of light, combinations thereof, and/or other characteristics of the visual indicator may be controlled based on the determined waterline level being above the threshold or at or below the threshold. As a non-limiting example, the visual indicator may emit a green light based on the determined waterline level being above the threshold, and a red light based on the determined waterline level being below the threshold. As another non-limiting example, predefined ranges of the waterline may be associated with a color output from the visual indicator 40. For example, waterline measurements in a first range may result in the visual indicator 40 displaying a first color (e.g., green), waterline measurements in a second range may result in the visual indicator 40 displaying a second color (e.g., blue), and waterline measurements in a third range may result in the visual indicator 40 displaying a third color (e.g., yellow).

Additionally, or alternatively, the screen 30 of the control box 38 may display the waterline measurements. Such measurements may be provided in real time and/or after measuring by the APC 12, and the measurements may be provided continuously and/or as otherwise desired. In certain embodiments, the screen 30 may display an indication of the waterline measurement textually or numerically. As a non-limiting example, waterline measurements within predefined ranges may be associated with a particular text display. For example, waterline measurements below a threshold may be associated with a display of "too low" on the screen 30. Other displays may include "low", "medium", "high", or any other suitable text to characterize the waterline level. In some examples, the visual indicator 40 and the screen 30 may both display an indication of the waterline. In some examples, the visual indicator 40 and the screen 30 may both display an indication of the waterline, and the waterline level can also be displayed at a user device associated with an APC in a swimming pool.

Optionally, the control box 38 may be communicatively coupled and/or operably coupled to an automatic water filler of the pool system 10. Optionally, upon detecting that the waterline 15 is below the threshold, the control box 38 may notify and/or control the automatic water filler to add water to the pool. The control box 38 may send an additional notification and/or control the automatic water filler to stop adding water to the pool upon determining, based on measurements by the APC 12, that the waterline is above the alert limit. Additionally, or alternatively, the automatic water filler may add a predefined amount of water to the pool 14 upon being notified the waterline 16 is below the alert limit (e.g., the amount of water to be added by the automatic water filler may be calculated based on the waterline level measured by the APC 12).

Exemplary concepts and combinations of features of the invention may include:
  A. A method of monitoring a waterline level of a swimming pool, wherein the waterline level of the swimming pool is determined by an automatic swimming pool cleaner within the swimming pool.

B. The method of statement A, wherein monitoring the waterline level comprises recording differential pressure measurements of the swimming pool using a pressure sensor of the automatic swimming pool cleaner, calculating a depth of the swimming pool based on the differential pressure measurements, and determining the waterline level based on the depth.

C. The method of statement A or B, wherein taking differential pressure measurements comprises determining a maximum pressure measurement of the swimming pool and a minimum pressure measurement of the swimming pool over a predetermined period of time.

D. A method of displaying a waterline alert for a swimming pool on a control box or a user device such as a smartphone, wherein the waterline alert is displayed when a waterline determined by an automatic swimming pool cleaner associated with the control box within the swimming pool is below a waterline alert limit.

E. The method of statement D, further comprising causing an automatic water filler to add water to the swimming pool when the measured waterline is below the waterline alert limit.

F. A method of monitoring a waterline level of a swimming pool includes determining the waterline level using an APC.

G. The method of statement F, wherein determining the waterline level comprises determining the waterline based on a maximum measured value and a minimum measured value for a characteristic of the swimming pool.

H. The method of statement G, wherein the characteristic of the swimming pool comprises a pressure measured by the APC.

I. The method of any of statements F-H, further comprising generating an alert based on the determined waterline being below a threshold.

J. The method of statement I, wherein generating the alert comprises generating an auditory or visual alert on a control box or a user device.

K. The method of any of statements F-J, further comprising controlling equipment for the swimming pool based on the determined waterline being below the threshold.

L. A pool system comprising an APC configured to monitor and/or determine the waterline level of the swimming pool.

M. The pool system of statement L, wherein the APC comprises sensing means for measuring a characteristic of the swimming pool, and wherein the waterline is determined based on the measured characteristic.

N. The pool system of statement M, wherein the sensing means comprises means for measuring a depth.

O. The pool system of statement N, wherein the sensing means comprises a pressure sensor, a depth sensor, a time-of-flight sensor, a coded wheel, or any other means for measuring the depth.

P. The pool system of any of statements L-O, further comprising a control box associated with the APC, wherein the control box comprises a user interface, and wherein the user interface is configured to provide at least an alert of the determined waterline level of the pool.

Q. The pool system of any of statements L-P, further comprising a controller communicatively coupled to the APC, wherein the controller is configured to generate a response based on a comparison of the measured waterline level to a threshold waterline level.

R. The pool system of any of statements L-Q, further comprising a pool filler, wherein the pool system is configured to activate the pool filler to add water to the swimming pool based on the determined waterline.

S. A pool system comprising an APC configured to measure at least one characteristic of the swimming pool, wherein the pool system is configured to determine a waterline level of the swimming pool based on the measured at least one characteristic.

T. A method of operating a pool system includes determining a waterline level of a swimming pool using an automatic swimming pool cleaner (APC) and controlling at least one piece of pool equipment associated with the swimming pool based on the determined waterline level.

U. The method of statement T, further comprising generating an alert based on the determined waterline level relative to a threshold waterline level.

V. The method of statement T or U, wherein generating the alert comprises controlling a visual indicator on a control box associated with the APC based on the determined waterline level relative to the threshold waterline level.

W. The method of any of statements T-V, wherein controlling the at least one piece of pool equipment comprises controlling a pool filler.

X. The method of any of statements T-W, further comprising causing a user interface of an external device to display the determined waterline level relative to a threshold waterline level.

The various aspects, embodiments, implementations or features of the described embodiments can be used separately or in any combination. In particular, it should be appreciated that the various elements of concepts from the figures may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention. As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Further, although applicant has described devices and techniques for use principally with APCs, persons skilled in the relevant field will recognize that the present invention conceivably could be employed in connection with other objects and in other manners. Finally, references to "pools" and "swimming pools" herein may also refer to spas or other water containing vessels used for recreation, training, or therapy and for which cleaning of debris is needed or desired.

That which is claimed:

1. A method of monitoring a waterline level of a swimming pool, the method comprising determining the waterline level relative to a threshold waterline level using an APC.

2. The method of claim 1, wherein determining the waterline level comprises determining the waterline level based on a maximum measured value and a minimum measured value for a characteristic of the swimming pool.

3. The method of claim 2, wherein the characteristic of the swimming pool comprises a pressure measured by the APC.

4. The method of claim 1, further comprising generating an alert based on the determined waterline level being below the threshold waterline level.

5. The method of claim 4, wherein generating the alert comprises generating an auditory or visual alert on a control box or a user device.

6. The method of claim 1, further comprising controlling at least one piece of equipment for the swimming pool based on the determined waterline level being below the threshold waterline level.

7. The method of claim 6, wherein controlling the at least one piece of equipment comprises controlling a pool filler to add water to the swimming pool based on the determined waterline level being below the threshold waterline level.

8. A pool system comprising an automatic swimming pool cleaner (APC) configured to measure at least one characteristic of a swimming pool, wherein the pool system is configured to determine a waterline level of the swimming pool relative to a threshold waterline level based on the measured at least one characteristic.

9. The pool system of claim 8, wherein the APC comprises at least one sensor for measuring the at least one characteristic of the swimming pool.

10. The pool system of claim 9, wherein the at least one sensor comprises a pressure sensor or a depth sensor.

11. The pool system of claim 8, further comprising a control box associated with the APC, wherein the control box comprises a user interface, and wherein the user interface is configured to provide an alert of the determined waterline level of the swimming pool.

12. The pool system of claim 8, further comprising a controller communicatively coupled to the APC, wherein the controller is configured to generate a response based on a comparison of the determined waterline level to the threshold waterline level.

13. The pool system of claim 12, wherein the controller is configured to generate an auditory or visual alert on an external device as the generated response.

14. The pool system of claim 12, wherein the controller is configured to control at least one piece of equipment for the swimming pool based on the determined waterline level relative to the threshold waterline level.

15. The pool system of claim 8, further comprising a pool filler, wherein the pool system is configured to activate the pool filler to add water to the swimming pool based on the determined waterline level being less than the threshold waterline level.

16. A method of operating a pool system includes determining a waterline level of a swimming pool using an automatic swimming pool cleaner (APC) and controlling at least one piece of pool equipment associated with the swimming pool based on the determined waterline level relative to a threshold waterline level.

17. The method of claim 16, further comprising generating an alert based on the determined waterline level relative to the threshold waterline level.

18. The method of claim 17, wherein generating the alert comprises controlling a visual indicator on a control box associated with the APC based on the determined waterline level relative to the threshold waterline level.

19. The method of claim 16, wherein controlling the at least one piece of pool equipment comprises controlling a pool filler.

20. The method of claim 16, further comprising causing a user interface of an external device to display the determined waterline level relative to the threshold waterline level.

* * * * *